Figure 1:
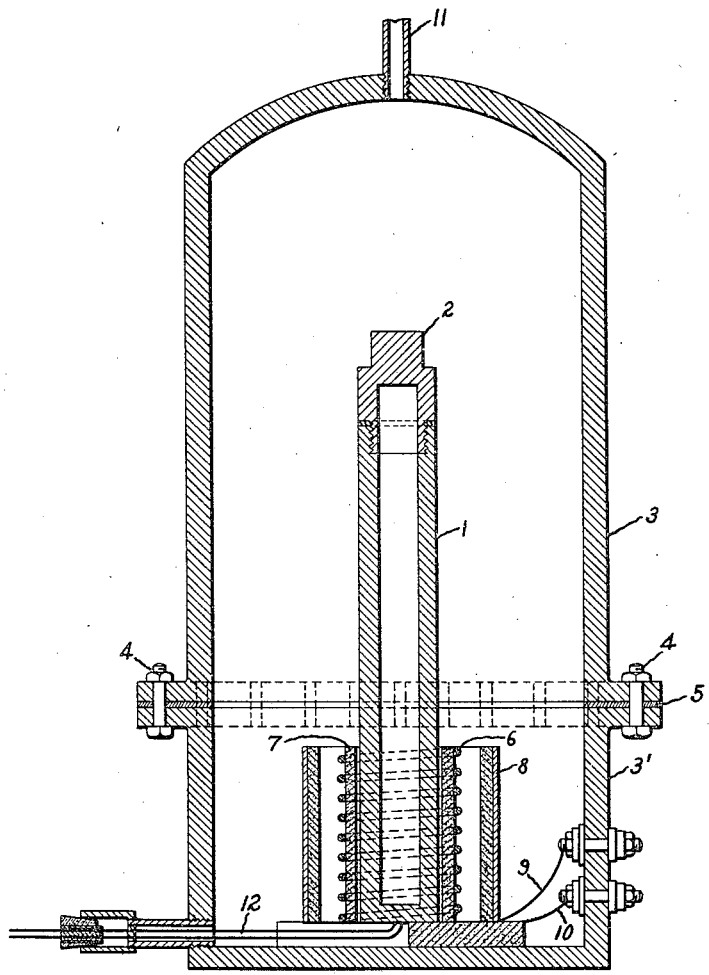

Jan. 5, 1926.

R. W. MOORE 1,568,685

PURIFICATION OF HIGHLY OXIDIZABLE METALS

Filed March 2, 1923  2 Sheets-Sheet 1

Inventor:
Roy W. Moore,
by
His Attorney.

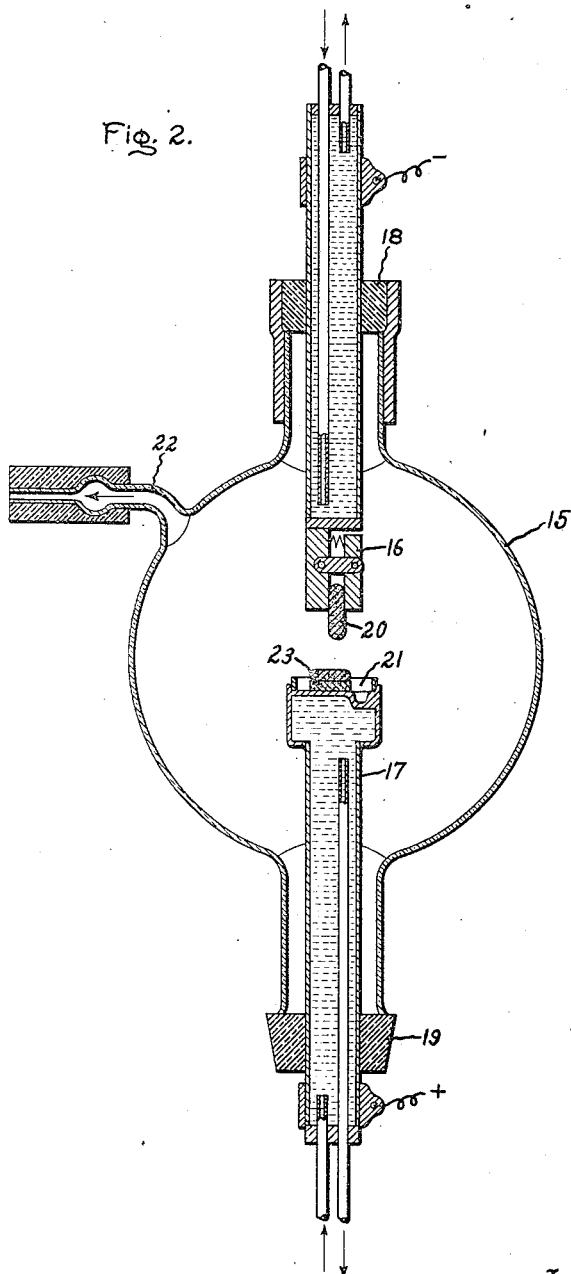

Patented Jan. 5, 1926.

1,568,685

UNITED STATES PATENT OFFICE.

ROY W. MOORE, OF SCHENECTADY, NEW YORK, ASSIGNOR TO GENERAL ELECTRIC COMPANY, A CORPORATION OF NEW YORK.

PURIFICATION OF HIGHLY-OXIDIZABLE METALS.

Application filed March 2, 1923. Serial No. 622,240.

*To all whom it may concern:*

Be it known that I, ROY W. MOORE, a citizen of the United States, residing at Schenectady, in the county of Schenectady, State of New York, have invented certain new and useful Improvements in Purification of Highly-Oxidizable Metals, of which the following is a specification.

The present invention relates to the preparation of homogeneous, coherent masses of highly oxidizable metal, such as uranium which heretofore has been obtained only in an impure, granular state.

As a consequence of my invention metallic uranium is rendered available in a coherent and ductile state.

Heretofore, metallic uranium has been available either as very small pellets which developed cracks when mechanically deformed or as rods of sintered, or loosely coherent metallic particles.

In accordance with my invention, crude metallic uranium, such as, for example, the product obtained by the reduction of the anhydrous chloride of uranium with an alkali metal, is heated somewhat above the fusing temperature of uranium under inert conditions and the substantially pure metal is withdrawn in a fused condition from the less fusible non-metallic constituents. The novel features of my invention will be pointed out in detail in the appended claims.

The accompanying drawing shows in Fig. 1 a vertical section of an apparatus suitable for reducing uranium from its compounds and Fig. 2 shows in vertical section one form of a purification apparatus.

In carrying out my invention, I prefer to utilize for reduction the dense, substantially anhydrous chloride, $UCl_4$, which is formed by the interaction of uranium oxide and sulphur monochloride. This chloride of uranium preferably is purified by sublimation and preferably protected from the atmosphere by dry nitrogen until it is used for reduction. As a reduction agent, I prefer to use resublimed, purified sodium. About 25% in excess of the amount of sodium theoretically necessary preferably is used.

The reaction between the uranium chloride and sodium is carried out in a container, such as shown for example in Fig. 1. The reaction container 1 shown in this figure consists of a steel tube provided at one end with a threaded cap 2. This container or bomb is surrounded by a larger vessel consisting of two flanged parts 3, 3′ which are capable of making a gas-tight fit when drawn together by the bolts 4, a suitable gasket 5 being interposed to seal the joint.

The reaction mixture is charged into the bomb under the protection of dry nitrogen, the plug 2 is screwed in place with an interposed gasket but the joint is not made perfectly gas-tight. The bomb is placed in good thermal relation with an electric heater 6 wound on an alundum tube 7 or other suitable support. A shield 8 consisting of an alundum tube surrounded by a metal shell may be provided outside of the heater 6. Current is conveyed to the heater by the sealed-in conductors 9, 10. The chamber 3 and the bomb 1 may be exhausted simultaneously by a tube 11. After exhausting to about 25 microns, heat is applied by the electric heater 6 until the reaction occurs with a sudden rise of temperature. The temperature may be observed by any suitable means such as a thermocouple 12. After cooling, the vacuum is broken by admitting nitrogen to the receptacle 3.

The reduction product is a sintered grayish mass comprising uranium, sodium, sodium chloride, unreduced uranium chloride and impurities. It is washed successively with absolute alcohol, dilute alcohol, water, dilute acetic acid, water and acetone.

A heavy, brownish powder containing pellets about one to two millimeters in diameter remains which consists largely of metallic uranium together with some uranium oxide.

This material unlike tantalum cannot be purified by the volatilization of impurities out of the mass with an arc in an inert gas. In accordance with my invention, the separation of metal and the oxide or other impurities is carried out as above indicated by causing the molten uranium to escape from the impurities in an inert environment and under such conditions that no alloyage occurs.

With this end in view the fusion is carried out in an apparatus such as shown in Fig. 2, by an arc in the presence of a gas of the helium group, such as argon. This apparatus comprises a container 15, consisting of transparent material such as glass or quartz, and provided with water-cooled electrodes 16, 17, passing through rubber stoppers 18, 19. The upper electrode 16 assumes the form of a clamp for holding a disc 20 of uranium and the lower electrode provides a depression 21 for collecting fused uranium. The gaseous contents of the container may be exhausted and a selected gas may be admitted by a tube 22. The disc 20 may consist of the impure reduction product pressed into coherent form in a suitable mold, and sintered by an arc in a rare gas to improve the strength.

A similar loosely coherent disc or discs 23 of uranium are placed on the edge of the lower electrode 17 which preferably consists of iron or Monel metal, and is so thin as to be maintained by the cooling water at a temperature too low to permit alloyage with the melted uranium.

After the container has been exhausted and washed with argon, a direct current arc of about 200 amperes is started between the electrodes in argon gas at about 75 to 100 microns. For example, the electrode 16 is pushed downwardly until the disc 20 comes into contact with disc or discs 23, the upper electrode then being withdrawn to strike an arc. By manipulation of the arc and by tilting the apparatus, the fused uranium can be caused to run into the depression 21 and collected in a substantially pure state. If the electrode 17 is kept well cooled no alloyage takes place.

The uranium pig metal thus formed has the appearance of polished iron. The metal oxidizes readily, a brightly polished surface of uranium becomes tarnished with brown oxide when exposed to air for a few days. The metal is ductile and permits mechanical working cold. Ingots have been converted into the form of thin sheets by rolling cold.

What I claim as new and desire to secure by Letters Patent of the United States, is,—

1. The process of separating uranium from a less fusible oxide which consists in fusing said metal under inert conditions and withdrawing the fused metal from the less fusible oxygenous material.

2. The process of treating non-ductile uranium containing compounds of uranium which consists in fusing said metal in an atmosphere of a gas of the helium group and separating the fused metal from the less fusible impurities.

3. The process of treating granular, impure uranium which consists in heating said material in argon gas to the fusing temperature of uranium, mechanically separating fused metal from less fusible impurities and collecting the fused metal as a substantially homogeneous mass.

4. The process of converting impure finely divided uranium to a coherent state which consists in heating said metal in an inert environment to a temperature sufficiently high to fuse uranium while leaving impurities therein intact and causing the fused metal to flow away from unfused impurities.

In witness whereof, I have hereunto set my hand this 28th day of February, 1923.

ROY W. MOORE.